United States Patent
Nydell

(10) Patent No.: US 10,826,809 B2
(45) Date of Patent: *Nov. 3, 2020

(54) MULTI-HOP REFLECTOR SESSIONS

(71) Applicant: Accedian Networks Inc., Saint-Laurent (CA)

(72) Inventor: Henrik Nydell, Stockholm (SE)

(73) Assignee: Accedian Networks Inc., St-Laurent (CA)

( * ) Notice: Subject to any disclaimer, the term of this patent is extended or adjusted under 35 U.S.C. 154(b) by 39 days.

This patent is subject to a terminal disclaimer.

(21) Appl. No.: 15/927,238

(22) Filed: Mar. 21, 2018

(65) Prior Publication Data

US 2018/0219758 A1   Aug. 2, 2018

Related U.S. Application Data

(63) Continuation of application No. 13/557,102, filed on Jul. 24, 2012, now Pat. No. 9,960,982.

(51) Int. Cl.
*H04L 12/26* (2006.01)

(52) U.S. Cl.
CPC ......... *H04L 43/0864* (2013.01); *H04L 43/50* (2013.01); *H04L 43/106* (2013.01); *H04L 43/12* (2013.01)

(58) Field of Classification Search
CPC ... H04L 43/0864; H04L 43/50; H04L 43/106; H04L 43/12
See application file for complete search history.

(56) References Cited

U.S. PATENT DOCUMENTS

| | | | |
|---|---|---|---|
| 7,006,472 B1 | 2/2006 | Immonen | |
| 7,742,406 B1 | 6/2010 | Muppala | |
| 2006/0285501 A1 | 12/2006 | Damm | |
| 2007/0274227 A1 | 11/2007 | Rauscher | |
| 2008/0273467 A1 | 11/2008 | Zhang | |
| 2009/0168783 A1 | 7/2009 | Mohan | |

(Continued)

FOREIGN PATENT DOCUMENTS

EP    1734690 A1    12/2006

OTHER PUBLICATIONS

Hedayat, K. et al., "A Two-Way Active Measurement Protocol (TWAMP)," Oct. 2008 (24 pages).

(Continued)

*Primary Examiner* — Walter J DiVito
(74) *Attorney, Agent, or Firm* — Stratford Managers Corporation

(57) ABSTRACT

A method for measuring and reporting performance parameters in a network having at least one originator for generating test protocol data units, and multiple reflectors for relaying the test protocol data units along successive segments of a test path in the network. The method generates the test protocol data units at the originator and transmits the test protocol data unit along a test path that includes multiple reflectors. Each reflector relays the test protocol data unit to the next reflector along the test path. Measurements of performance parameters are collected from the multiple reflectors in the test protocol data unit by inserting timestamps into the test protocol data unit at the originator and each of the reflectors to identify the departure and arrival times for each test protocol data unit at the originator and each of the reflectors in both the downstream and upstream directions along the test path.

15 Claims, 8 Drawing Sheets

(56) References Cited

U.S. PATENT DOCUMENTS

| | | |
|---|---|---|
| 2009/0175274 A1 | 7/2009 | Aggarwal |
| 2011/0029687 A1 | 2/2011 | Kirrmann |
| 2011/0176416 A1 | 7/2011 | Bhatti |
| 2011/0222412 A1 | 9/2011 | Kompella |
| 2012/0063345 A1 | 3/2012 | Krzanowski |
| 2012/0128000 A1 | 5/2012 | Baillargeon |

OTHER PUBLICATIONS

Malkin, G., "Traceroute Using an IP Option," Xylogics, Inc., Jan. 1993 (7 pages).
Settey, V., "Advanced Quality Performance Measurement with IP SLA," Cisco Expo 2008 (88 pages).
Sun, L. et al., "Flow-Based Performance Measurement," Internet Engineering Task Force, Jun. 29, 2012 (15 pages).
Cisco *IP SLA* Probe User's Guide, Feb. 7, 2007 (5 pages).
Extended European Search Report in European Patent Application No. 13177793.0, dated Nov. 12, 2013 (11 pages).
Extended European Search Report in European Patent Application No. 13177792.2, dated Nov. 15, 2013 (9 pages).

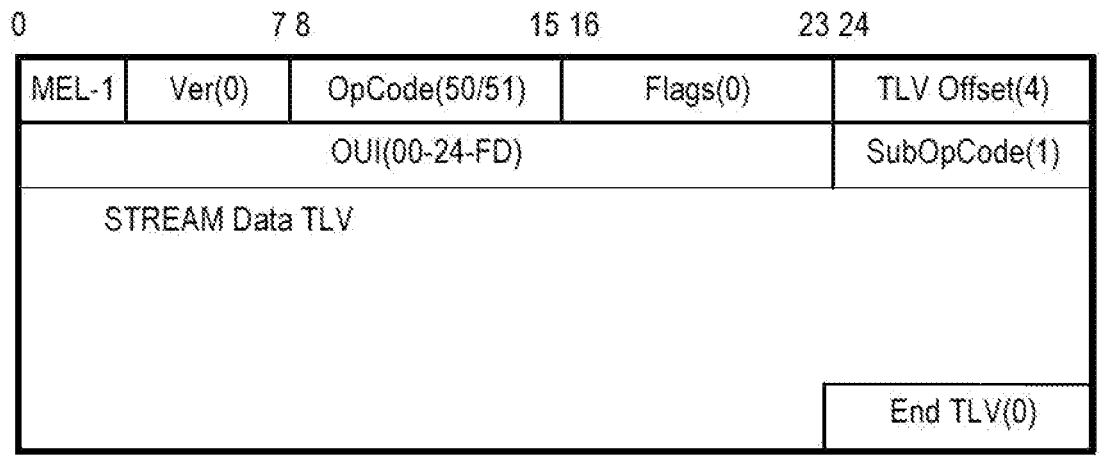

FIG. 6

| Field | Size (bit) | Description |
|---|---|---|
| MEL | 3 | MEG-Level in the range 0 to 7. |
| Ver | 5 | Version. Set to zero (0). |
| OpCode | 8 | PDU OpCode: Set to VSM (51) by the Originator 100 and VSR (50) by the Reflector 9101, 102, 103, 104) |
| Flags | 8 | Always set to zero (0). |
| TLV Offset | 8 | Offset to the first TLV. Always set to 4. |
| OUI | 24 | OUI vendor code as defined by IEEE, 0024FD16 for example |
| SubOpCode | 16 | Reserved for future use. Must be set to zero (0). |
| SeqNumUL | 8 | SubOpCode used to identify a PDU with the STREAM Date TLV. The SubOpCode for the STREAM Data TLV has been assigned value 1. |
| Stream Data TLV | | See Figure 8 |
| End TLV | 8 | Always set to zero (0). Indicates the End of the PDU |

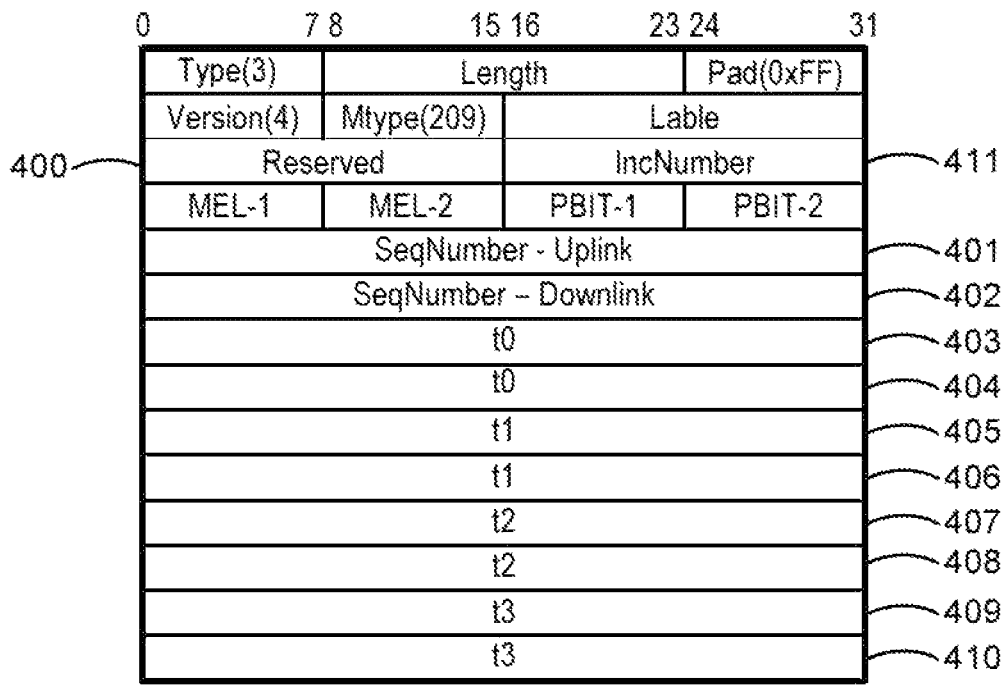

FIG. 9

| Field | Size (bit) | Description |
|---|---|---|
| Type | 8 | Always set to 3, i.e. the type of TLV (3=data). |
| Length | 16 | Length of the data field in the Data TLV data |
| Pad | 8 | Always set to ff16. Use to align the STREAM header. |
| Version | 8 | STREAM version. Current version is 4 (first byte of STREAM header). |
| Mtype | 8 | STREAM Message Type. Set to 209. |
| Lable | 16 | Unique Label between pair (src/dst) of MAC addresses |
| Reserved | 16 | Reserved for future use. Must be set to zero (0). |
| SeqNumUL | 32 | Sequence number for uplink / forward path direction (Originator 100 to Reflector 102). |
| t0 | 64 | Originator 100 Transmit timestamp. Set by the Originator 100 upon transmission. |
| t3 | 64 | Originator 100 Receive timestamp. The Originator 100 sets this timestamp to zero upon transmission. This timestamp is set again by the Originator 100 upon reception of the reply from the Reflector 102. |

| Field | Size (bit) | Description |
|---|---|---|
| IncNum | 16 | Incarnation number. Assigned to the Reflector 101, 102, 103, 104 when the Reflector instance is setup and used in the reply sent back to the Originator 100. The Originator 100 must set the IncNum to zero upon transmission. |
| SeqNumDL | 32 | Sequence number for downlink direction (Reflector 101, 102, 103, 104 to Originator 100). The Originator 100 must set theSeqNumDL to zero upon transmission. |
| MEL-1 | 8 | Reflector 101, 102, 103, 104 received MEG Level (MEL). Must be set by the Reflector 101, 102, 103, 104. The Originator 100 must set the MEL1 to ff16 upon transmission. |
| MEL-2 | 8 | Reflector 101, 102, 103, 104 transmitted MEG Level (MEL). Must be set by the Reflector101, 102, 103, 104. The Originator 100 must set the MEL2 to ff16 upon transmission. |
| PBIT-1 | 8 | Reflector101, 102, 103, 104 received VLAN PBIT setting. Only valid and set by the Reflector 101, 102, 103, 104 if the receive interface is a VLAN interface. The Originator 100 must set the PBIT1 to ff16 upon transmission. |
| PBIT-2 | 8 | Reflector 101, 102, 103, 104 transmitted VLAN PBIT setting. Only valid and set by the Reflector 101, 102, 103, 104 if the arrival (receive) interface is a VLAN interface. The Originator 100 must set the PBIT2 to ff16 upon transmission. |
| T1 (106, 108, 110, 112) | 64 | Reflector101, 102, 103, 104 receive timestamp. The Originator 100 sets this timestamp to zero upon transmission. Format: seconds:ns |
| T2 (114, 116, 118, 120) | 64 | Reflector 101, 102, 103, 104 transmit timestamp. The Originator 100 sets this timestamp to zero upon transmission. Format: seconds:ns |

FIG. 10

MULTI-HOP REFLECTOR SESSIONS

CROSS REFERENCE TO RELATED APPLICATIONS

This application is a continuation of U.S. patent application Ser. No. 13/557,102, filed Jul. 24, 2012, now allowed, which incorporates by reference in its entirety the following application, which has the same filing date as the present application: "Automatic Setup of Reflector Instances," by Hansson, Hagsand and Wallman.

FIELD OF THE INVENTION

Multi-hop Reflector Sessions in the context of an Ethernet Operations Administration and Maintenance (OAM) framework.

BACKGROUND OF THE INVENTION

For many years, Ethernet has been used as a LAN (Local Area Network) technology, and enterprises have managed these networks with the use of Internet protocols such as Simple Network Management Protocol (SNMP), ICMP Echo (or IP Ping), IP Traceroute, and Cisco Unidirectional Link Detection Protocol (UDLD). EOAM (Ethernet Operations Administration and Maintenance) is a set of protocols for installing, monitoring, and troubleshooting MANs (Metropolitan Area Network) and WANs (Wide Area network). The use of Ethernet as a networking technology has created the need for a new set of OAM protocols since there are now large and complex networks with a wide user base that involves different operators providing end-to-end services.

The IETF (Internet Engineering Task Force) develops and promotes Internet standards. The One-way Active Measurement Protocol [RFC4656] (OWAMP) provides a common protocol for measuring one-way metrics between network devices. OWAMP can be used bi-directionally to measure one-way metrics in both directions between two network elements. However, it does not accommodate round-trip or two-way measurements.

Two-Way Active Measurement Protocol (TWAMP) [RFC5357] provides a standards-based method for measuring the round-trip IP performance (packet loss, delay and jitter) between two devices. TWAMP uses the methodology and architecture of One-Way Active Measurement Protocol (OWAMP) to define a way to measure two-way or round-trip metrics.

There are four logical entities in TWAMP: the Control-Client, the Session-Sender, the Server, and the Session-Reflector. The Control-Client and Session-Sender are typically implemented in one physical device (the "Client") and the Server and Session-Reflector in a second physical device (the "Server") with which the two-way measurements are being performed.

The Control-Client and Server establish a TCP (Transmission Control Protocol) connection and exchange TWAMP-Control messages over this connection. When the Control-Client wants to start testing, the Client communicates the test parameters to the Server. If the Server agrees to conduct the described tests, the test begins as soon as the client sends a Start-Session message. As part of a test, the Session-Sender sends a stream of UDP-based (User Datagram Protocol) test packets to the Session-Reflector, and the Session-Reflector responds to each received packet with a response UDP-based test packet. When the Session-Sender receives the response packets from the Session-Reflector, the information is used to calculate two-way delay, packet loss, and packet delay variation between the two devices.

The ITU (International Telecommunication Union) is the United Nations specialized agency for information and communication technologies (ICTs). ITU standards (called Recommendations) are fundamental to the operation of ICT networks. ITU-T Y.1731 performance monitoring provides standards-based Ethernet performance monitoring that encompasses the measurement of Ethernet frame delay, frame delay variation, and frame loss and throughput.

IEEE 802.1ag *IEEE Standard for Local and Metropolitan Area Networks Virtual Bridged Local Area Networks Amendment 5: Connectivity Fault Management* is a standard defined by IEEE (Institute of Electrical and Electronics Engineers). It defines protocols and practices for OAM for paths through bridges and local area networks (LANs). It is largely identical with ITU-T Recommendation Y.1731. The standard:

- Defines maintenance domains, their constituent maintenance points, and the managed objects required to create and administer them.
- Defines the relationship between maintenance domains and the services offered by VLAN-aware bridges and provider bridges.
- Describes the protocols and procedures used by maintenance points to maintain and diagnose connectivity faults within a maintenance domain.
- Provides means for future expansion of the capabilities of maintenance points and their protocols.

ITU Y.1731 and similar OAM standards (including but not limited to TWAMP) require an explicit negotiation between the Originator (Client) and the Reflector (Session-Reflector) to establish a unique Flow Identifier. This approach prevents a Test PDU (protocol data unit) from being processed by a multitude of Reflectors downstream from an Originator, as illustrated in FIG. 1.

Due to the need to explicitly generate different OAM sessions (one per pair of Originator and Reflector) in the current state of the art, it is not possible to generate a Test PDU from an Originator that can collect measurements from more than one Reflector at a time along a test path, even though the Test PDU may traverse said Reflectors in order to reach a remote Reflector.

FIGS. 2-4 are from the ITU Y.1564 standard and are used to illustrate the need for delay and other measurements needed to qualify an Ethernet circuit at installation. FIG. 2, from ITU Y.1563, illustrates the layered nature of the performance of the Ethernet service. This network is comprised of connection-oriented or connectionless links that are connected to bridges that will process the Ethernet Layer inside the network. Each time an Ethernet frame is going through an Ethernet layer, it will be processed for integrity and sent to the next bridge through a Lower Layer (LL) connection. Lower Layers are based on multiple technologies, for example, SDH, OTN, PDH, MPLS, ATM and ETY. The performance of all Ethernet Layers and Lower Layers will impact the end-to-end performance of the network used to deliver services.

Higher layers may be used to enable end-to-end communications. Upper layers may include protocols like IP, MPLS and Ethernet that allow a greater scalability for network deployment. Other protocols, like TCP, provide the capability to retransmit frames should a frame loss occur. Unfortunately, two of the drawbacks of TCP are added delay in the transmission of user information, and the possible limitation of maximum advertised window size and interaction with the bandwidth-delay product and flow control interaction with loss and delay of the Ethernet Service. The embodiment is able to perform the requested measurement independently from the fact that the links (or Lower Layer—LL) used to carry the Ethernet Virtual Circuits (EVC) may operate at Layer 2 or Layer 3.

FIG. 3, taken from ITU Y.1564, provides a simple example of Ethernet service areas and is referred to as an Ethernet service activation measurement. The goal of the test is to verify the configuration and performance of Ethernet-based services. The test verifies Ethernet Service Attributes including Committed Information Rate (CIR), Excess Information Rate (EIR) and other attributes. This shows the different portions of a network that support an Ethernet service instance.

It is further shown that the UNI reference point occurs in the middle of the access link, or more precisely that the UNI is a reference point whose functionality is split into customer (UNI-C) and network (UNI-N) components. From a service provider's perspective, they need to deliver services from UNI-C to UNI-C and it is from this perspective that the test methodology was created.

The CE (Customer Equipment) and the operator's network exchange service frames across the UNI, a service frame is an Ethernet frame transmitted across the UNI toward the Service Provider (called ingress service frame) or an Ethernet frame transmitted across the UNI towards the CE (called an egress service frame). Many services run on each UNI. They are qualified by their attributes:

Connection type
Traffic parameters: QoS (including VLAN information), traffic type (data vs. management), etc.
Bandwidth profile
Performance criteria: FD, FDV, Frame Loss ratio, availability, etc.

From this, it is easy to see that an Ethernet Virtual Circuit may actually span multiple transport networks at Layer 2 or Layer 3. This creates challenges to efficiently measure delays and packet loss with traditional methods. The performance measurements can only be taken outside of the inner boundaries of the Transport Operator Network.

FIG. 4, from ITU-T y.1563, illustrates how Measurement Points (MP) are typically found at the boundaries between different Lower Layers used to support the EVC. The positioning of these MPs (or Reflectors) is critical to obtain adequate measurements. As per the above diagram, a 2-way delay measurement is typically taken from the SRC to the DST and back to the SRC and does not provide detailed delay information for each Exchange Link (or Lower Layer). The performance measurements can only be taken outside of the inner boundaries of the Network Section where MPs are addressable for the purpose of performance measurements.

SUMMARY OF THE INVENTION

In accordance with one embodiment, a method is provided for measuring and reporting performance parameters in a network having at least one originator for generating test protocol data units, and multiple reflectors for relaying the test protocol data units along successive segments of a test path in the network. The method generates the test protocol data units at the originator and transmits the test protocol data unit along a test path that includes multiple reflectors. Each reflector relays the test protocol data unit to the next reflector along the test path. Measurements of performance parameters are collected from the multiple reflectors in the test protocol data unit by inserting timestamps into the test protocol data unit at the originator and each of the reflectors. The timestamps identify the times when the test protocol data unit (1) departs from the originator and (2) arrives at and departs from each of the reflectors in both the downstream and upstream directions along the test path.

In one implementation, each of the reflectors is configured with the addressing information of the next reflector in the test path, and the addressing information is used to relay the test protocol data unit to the next reflector. Each reflector is configured with that reflector's own addressing information for use in receiving the test protocol data packet from the next reflector during the transmission of the test protocol data packet from the last reflector back to the originator.

BRIEF DESCRIPTION OF THE DRAWINGS

The invention may best be understood by reference to the following description taken in conjunction with the accompanying drawings.

FIG. 6 is the ITU Y.1731 Vendor Specific OAM PDU (ETH-VSP).

FIG. 7 is a table of all the PDU fields set by the Originator.

FIG. 8 illustrates the extensions to the format of the STREAM Data Type-Length-Value (TLV).

FIG. 9 illustrates the generated and extended Stream Data TLV by the Originator.

FIG. 10 illustrates the generated and extended Stream Data TLV when used by a Reflector.

DETAILED DESCRIPTION OF ILLUSTRATED EMBODIMENTS

Figure 1:
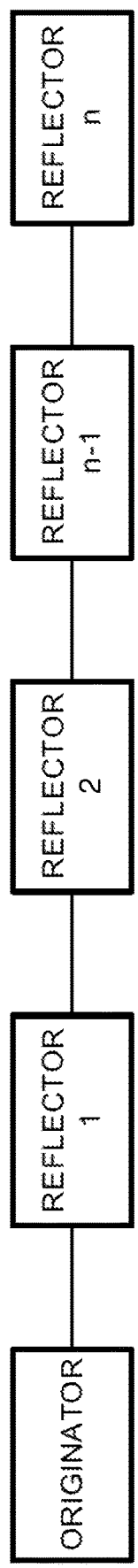
FIG. 1 is a diagrammatic illustration of a test path from an Originator to multiple Reflectors in an Ethernet.
Figure 2:
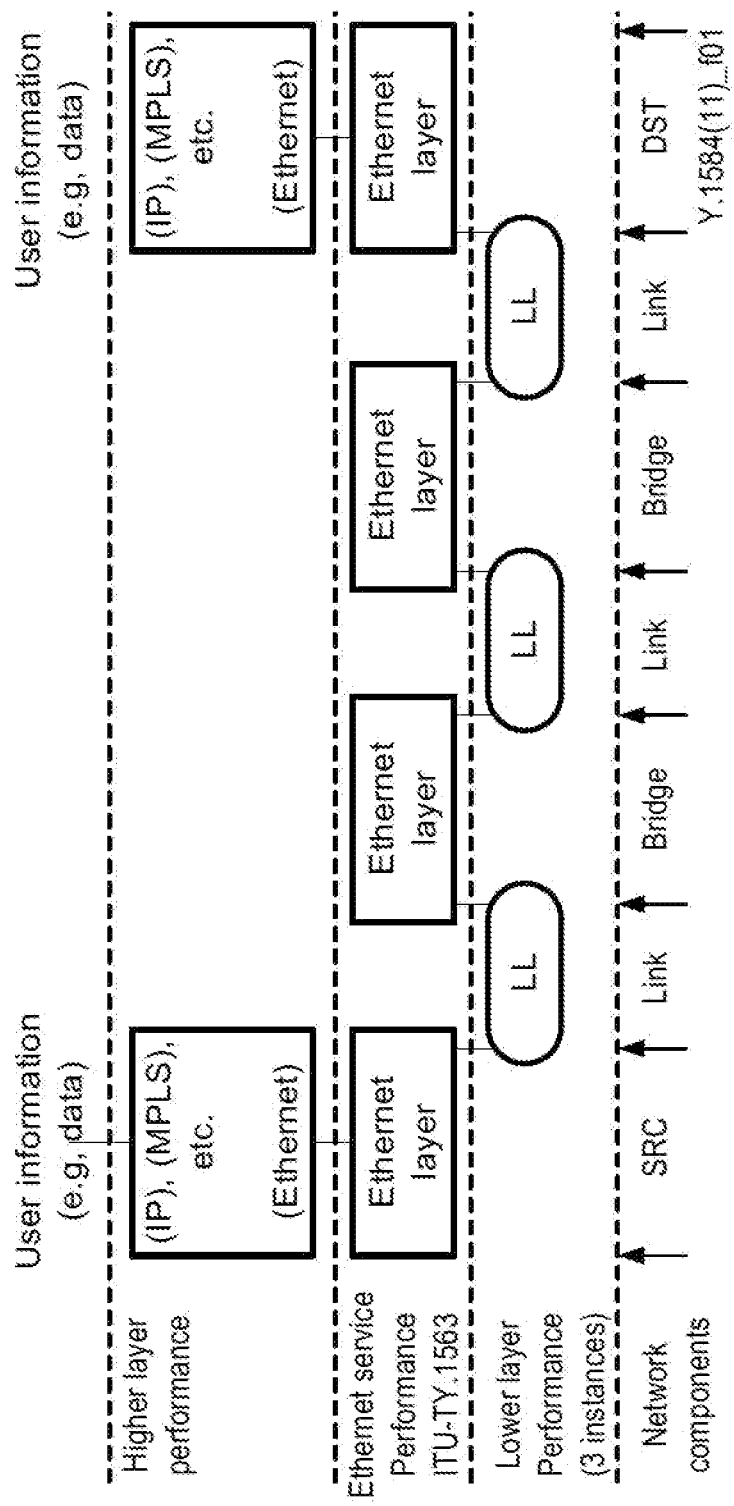
FIG. 2 is an illustration of the layered structure of the performance of an Ethernet service, from ITU Y.1563.
Figure 3:
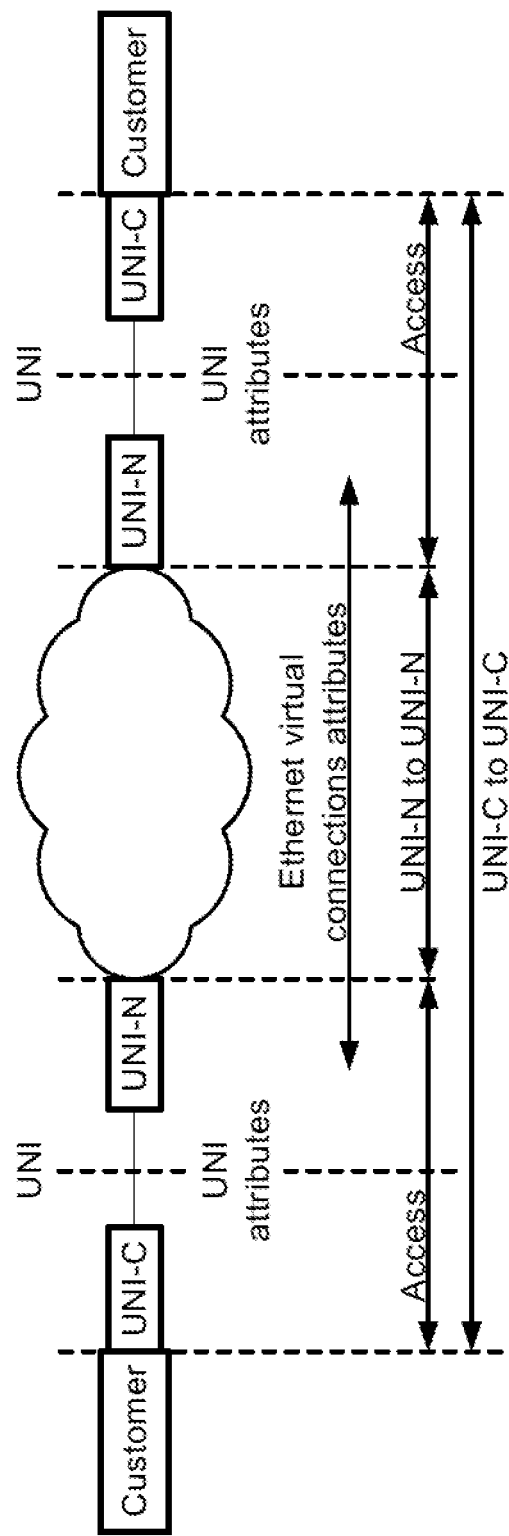
FIG. 3 is an example of an Ethernet service activation measurement, from ITU Y.1564.

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

The embodiment operates in the context of the need for a framework that allows for performance measurements as defined in standards such as ITU-T Y.1731, IETF RFC 5357 (TWAMP) and IEEE 802.1ag. These standards all rely on the notion of an Originator (or Session-Sender) that generates test traffic toward a Reflector (or Session-Reflector), where 2-way measurements require that the Reflector returns (or reflects) the test traffic toward the Originator.

These standards allow efficient delay and packet loss measurements via a bi-directional measurement function, i.e. 2×OneWay, for switched Layer 2 networks, with the capability to measure and report all required metrics (delay, jitter, loss, reorder, etc) for both directions (uplink and downlink) to state the performance of the network.

The Ethernet OAM framework defines a number of functions for connectivity verification as well as performance monitoring. This embodiment focuses on two of these functions, Ethernet Loopback (ETH-LB) and two-way Frame Delay Measurement (ETH-DM). Both functions are bi-directional, i.e. the Originator will send one or more measurement frames to a Reflector, which sends the measurement frames back (after processing and swapping of MAC addresses, etc) to the Originator.

In ETH-LB, all measured and reported metrics (delay, jitter and frame statistics) are based on two-way measures.

When measuring ETH-DM Delay and jitter (delay variation) the DMM/DMR (Delay Measurement Message/Delay Measurement Reply) messages are extended to contain a Data TLV (Type-Length-Value) with a 32 bit sequence number to measure and report frame statistics (i.e. loss, reorder, duplicated packets) metrics based on two-way measures.

The embodiment is a bi-directional Layer 3 solution with the capability to measure and report the metrics mentioned above for both directions. A 2×OneWay session consists of an Originator and a Reflector.

When multiple Reflectors are set downstream from an Originator, the Originator needs to explicitly generate Test PDUs directly toward each Reflector in order to obtain 2-way delay and packet loss measurements. In order to reduce the test traffic and to collect measurements more efficiently and within a better controlled window of time, there is a need to generate Test PDUs that can traverse multiple Reflectors and collect detailed measurements.

The ability to generate a single Test PDU (or a sequence of Test PDU) addressed to the first Reflector which will then relay the Test PDU to a next Reflector downstream which may also relay the Test PDU downstream until the end of a chain of Reflectors and then back upstream (through the chain of Reflectors) all the way back to the Originator is highly desirable. This helps to significantly reduce the test traffic while collecting measurements related to the same Test PDU to improve the correlation of the measurements.

This embodiment does not require the explicit setup of an "OAM session" between the Originator and the Reflector. The required Flow Identifier to uniquely identify one of potentially multiple OAM sessions is automatically generated by the Reflector. This method not only simplifies the operation of the pair of Originator-Reflector, it also allows a Reflector to relay the Test PDU downstream to another Reflector to extend the range of the measurements obtained by a single 2×OneWay Test PDU to better correlate the overall operation of a network at a specific point in time. By having each Reflector insert specific timestamp markers in the downstream direction (away from the Originator and beyond the initial Reflector in the test path) and then on the upstream direction (for the return path toward the Originator) it is possible to obtain detailed delay and packet loss measurements for each Lower Layer connection where a Reflector is present while increasing the correlation of the measurements since they are all relative to the same original Test PDU.

By having each Reflector in a test path inserting a Stream Data TLV to hold their specific measurements and updating the meaning of the Timestamps as defined in ITU Y.1731 (and related standards), it is possible to collect measurements from multiple Reflectors along a test path by generating a single Test PDU from an Originator. The amount of test PDU generated by the Originator is significantly reduced while collecting more measurements from a single PDU from the Originator. The additional measurements from intermediate Reflector hops significantly enhances the information available to more precisely identify delays and/or packet loss on specific segments (between a pair of Reflector units).

In this embodiment, the initiator of a 2-way delay measurement is called an Originator (Session-Sender) and the Reflector (Session-Reflector) replies to the 2-way delay measurement requests.

Figure 5:
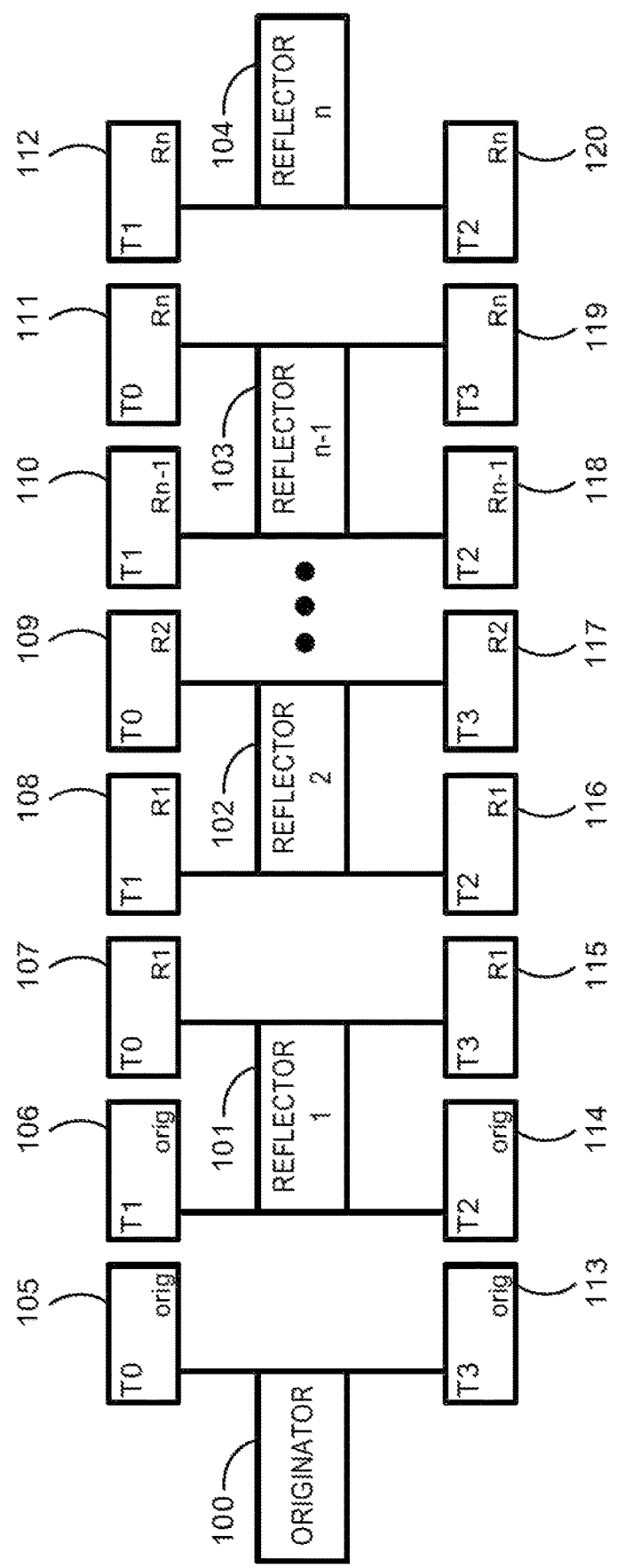
FIG. 5 is a diagrammatic illustration of where the timestamps are generated for 2-way loopback measurements across multiple Reflectors.

FIG. 5 illustrates where the timestamps (105, 106, 107, 108, 109, 110, 111, 112, 113, 114, 115, 116, 117, 118, 119, 120) are generated for 2-way loopback measurements from the Originator 100 across multiple Reflectors (101, 102, 103, 104). It is possible to obtain delay and packet loss measurements from a multitude of Reflectors (101, 102, 103, 104) each distant by one hop (although each hop may result into multiple sub-networks or Exchange Links) By leveraging the measurements accumulated in the Test PDU (via Stream Data TLVs inserted in the payload portion of the Test PDU), it is possible for the Originator 100 to collect and compute detailed delay and packet loss performance measurements. For instance, it is possible to compute the following:

T3orig-T0orig=total 2-way delay from Originator (100) all the way to Reflector n (104)

T1orig-T0orig=1-way delay from Originator (100) to Reflector 1 (101)

T1R1-T0R1=1-way delay from Reflector 1 (101) to Reflector 2 (102)

T1Rn-T0Rn-1=1-way delay from Reflector n-1 (103) to Reflector n (104)

T1Rn-T0orig=1-way delay from Originator (100) all the way to Reflector n (104)

T3 Rn-1-T2 Rn=return delay from Reflector n (104) to Reflector n-1 (103)

T3R2-T3R1=return delay from Reflector 2 (102) to Reflector 1 (101)

T3R1-T0R1=total 2-way delay from Reflector 1 (101) all the way to Reflector n (104) and back One familiar with the state of the art shall be able to compute additional delay measurement information based on the multiple timestamps accumulated along the test path in the downstream (toward the end Reflector 104) and upstream return test path toward the Originator 100.

There are multiple options to allow the Test PDU from the Originator 100 toward the Reflector 1 (101) to proceed along the test path across multiple downstream Reflectors (102, 103, 104).

In one implementation, each Reflector (101, 102, 103, 104) is configured with the addressing information required to relay the Test PDU to the next downstream Reflector. Using this approach, each Reflector (101, 102, 103, 104) only needs to be configured with information about the Reflector directly downstream from it (as per the defined test path). When relaying the Test PDU to the downstream Reflector, the relaying Reflector will include its addressing information to be able to receive the reply from the downstream Reflector.

In another implementation, the Originator 100 addresses the Test PDU directly to the last Reflector (104) in the chain of Reflectors (101, 102, 103, 104) in the test path, but route to the Reflector 1 (101) along the test path. The intermediate Reflectors (102, 103) operate as a series of "routers," with each Reflector inserting its own measurements in the appropriate Stream Data TLV assigned to it and then relaying the Test PDU to the next Reflector in the test path (downstream or upstream direction).

In yet another implementation, the Originator 100 is aware (by configuration or via a discovery method) of the list of Reflectors (101, 102, 103, 104) along the test path. This allows the Originator 100 to pre-fill all of the required Stream Data TLV 300 (one per Reflector 101, 102, 103, 104 instance) as part of the payload of the Test PDU. An index field is incremented by each intermediate Reflector 101, 102, 103, 104 to allow it to identify which Stream Data TLV 300 is assigned to it. The addressing information of the next/downstream Reflector is also included in the Test PDU by the Originator 100. This information is then used by an intermediate Reflector (101, 102) to relay the Test PDU to the next Reflector in the downstream direction and up toward the previous Reflector in the upstream/return path direction.

In another implementation, the Test PDU is addressed to the last Reflector 104 along the test path. Each intermediate Reflector operates in a Promiscuous Mode and peeks into the Test PDU to insert its own measurements in the appropriate Stream Data TLV before relaying the Test PDU to the next Reflector along the test path in the downstream or upstream direction (as required).

In another implementation, each intermediate Reflector generates a direct reply to the Originator 100 as if the Test PDU had been directly received from that Originator 100. This approach can generate the same level of measurements, but care is needed since the higher number of replies generated toward the Originator could overflow the Originator or impact the performance of user data when used in service rather than during the Service Activation phase.

When there are multiple (downlink) Reflectors behind a given Reflector, for instance in a star topology, the Originator 100 is expected to handle each potential branch of the star topology as a different test path and initiate a 2-way measurement for each possible path independently of the other.

Depending on the specific definition of the various standards where the present embodiment applies, there may be a need to extend the encoding of the test PDUs if there is not native support for at least 3 timestamps.

An example of a standard that support the use of TLV to carry at least 3 timestamps is the ITU Y.1731 standard. In order to carry the measurements from each Reflector visited along the test path, the ITU Y.1731 protocol provides an extensible encoding via the concept of vendor specific OAM-PDU (ETH-VSP). A Stream Data TLV is added to the ETH-VSP encoding for each visited Reflector to carry the 2-way measurement test defined in this disclosure. The timestamps (T0 to T3) use the timestamp format defined in IEEE 1588-2004. The Stream Data TLV for ETH-VSP has been assigned MType=209.

FIG. 6 illustrates the ITU Y.1731 Vendor Specific OAM PDU (ETH-VSP).

FIG. 7 is a table of all the PDU fields set by the Originator 100 which cannot not be modified by the Reflector (101, 102, 103, 104), except the OpCode field 302. The Stream Data TLV 300 is extended for this embodiment.

FIG. 8 illustrates the extensions to the format of the Stream Data TLV 300. The Stream Data TLV 300 shall be extended to include a unique identifier (or index) for each Reflector (101, 102, 103, 104) along the test path. The Reserved Field 400 is used to hold a unique Reflector identifier.

Furthermore, each Stream Data TLV 300 in the payload of the Test PDU shall include the 4 timestamps needed to gather the necessary delay measurements from each Reflector in the test path.

FIG. 9 illustrates the generated and extended Stream Data TLV by the Originator 100.

FIG. 10 illustrates the generated and extended Stream Data TLV 300 when used by the Reflector (101, 102, 103, 104) in reply to a test PDU received from the Originator 100 (directly or via an upstream Reflector).

When a standard, such as RFC5357 TWAMP, does not provide native support for at least 3 timestamps per reflector hop (such as multiple TLV), there is a need to extend the said protocol. An implementation is to leverage the unused portion (or filler) of the Test Packet to hold a structure that can store the at least 4 timestamps and, uplink and downlink sequence numbers for each Reflector hop. Such a structure can also be extended to fundamentally include the additional information defined in the Data Stream TLV 300 in FIG. 6 MEG Level including but not limited to: received and transmitted (600, 601), P-Bit received and transmitted (602, 203), etc. The TLV encoding shown as part of an implementation compatible with ITU Y.1731 could be used or any other variation well known to those familiar with the art. The selected implementation picks a Test PDU size large enough to hold the Sequence Numbers (401, 402) and Timestamps (403, 404, 405, 406, 407, 408, 409, 410) information for each Reflector hop without exceeding the maximum PDU size supported by the Service OAM standard and the underlying Layer 2 and/or Layer 3 networks or network segments.

To identify the TLV to use for a specific Reflector (101, 102, 103, 104), when a Reflector (101, 102, 103, 104) receives a Test PDU with the OpCode 302 set to VSM (51), the Reflector searches the set of Stream Data TLV 300 in the payload of the Test PDU to determine whether there is already a Stream Data TLV 300 that was generated by the Originator 100 for this Reflector (101, 102, 103, 104). If the Stream Data TLV 300 is not found, the Reflector (101, 102, 103, 104) adds a Stream Data TLV 300 after the last Stream Data TLV 300 found and moves the End TLV 301 marker after the newly inserted Stream Data TLV 300. The Reflector (101, 102, 103, 104) sets the Reserved/Reflector ID field 500 to the unique ID assigned to the Reflector (101, 102, 103, 104).

The Reflector then sets the T0 and T1 timestamps (105, 106, 107, 108, 109, 110, 111, 112).

If there is another downstream Reflector, the Reflector relays the Test PDU to the next Reflector.

Otherwise, if the Reflector is the last one in the chain of Reflectors along the test path (104), it changes the OpCode field 302 to VSR (50) and sets the T2 and T3 timestamps (120, 119). For the Reflector at the end of the test path, the T3 timestamp 119 is set to 0. Once the Stream Data TLV 300 is updated, the VSR is returned to the upstream Stream Data TLV 300 toward the Originator 100.

If a Reflector 101, 102, 103, 104 receives a Test PDU with the OpCode 302 already set to VSR, it retrieves the Stream Data TLV 300 with the Reflector ID of the Reflector and then updates the T2 and T3 timestamps (113, 114, 115, 116, 117, 118, 119, 120) before relaying the Test PDU upstream to the previous Reflector or the Originator 100 if there are no upstream Reflectors along the return test path.

If there is no Stream Data TLV 300 found before the one assigned to the Reflector, this is an indication that there is no other Reflector and the Test PDU is returned directly to the Originator 100.

Since a Reflector Session is automatically set up, a timeout mechanism is implemented to tear down a Reflector session and free associated resources whenever Test PDUs are not received from the Originator 100 (identified by a unique Flow Identifier) for a pre-determined period of time (typically in the order of 10 seconds). Should new Test PDUs be received from the same Originator 100 after the expiration of the idle timer, the Reflector (101, 102, 103, 104) automatically generates a new Flow Identifier. A complementary tag is therefore required to indicate to the Originator 100 that a new Reflector Session has been automatically set up. This is achieved by an Incarnation Number (IncNum 411 in the Stream Data TLV 300) returned by the Reflector (101, 102, 103, 104). The IncNum 411 is an unsigned integer value generated from a global incarnation counter, and the counter is increased by one (1) each time a new IncNum 411 is allocated.

IncNum=IncNumCnt;
IncNumCnt=IncNumCnt+1;

The above 2-step operation is implemented as an atomic operation to ensure the incarnation number counter is increased at the same moment a new IncNum 411 is assigned to a Reflector instance.

The global incarnation number counter is initialized once to a random number at system startup to minimize the probability of reusing the same IncNum 411 for a Reflector instance after a system restart. The wrap-around rate of the global incarnation counter depends on the arrival rate of new measurement streams and the re-activation rate of already running measurement streams.

In one embodiment, a Reflector (101, 102, 103, 104) compares a newly generated IncNum 411 with an older Reflector Session instance, and if equal, generates a new IncNum 411, to avoid assigning the same IncNum 411 to a Reflector Session serving one and the same measurement stream.

The embodiment described is applicable to software-based, HW-based and small-form pluggable (SFP) Field Programmable Gate Array (FPGA) Originators and Reflectors. The embodiment also applies to any network device that can be addressed using a layer-2 address (MAC address) and/or a layer-3 address (such as an IP address).

Figure 4:
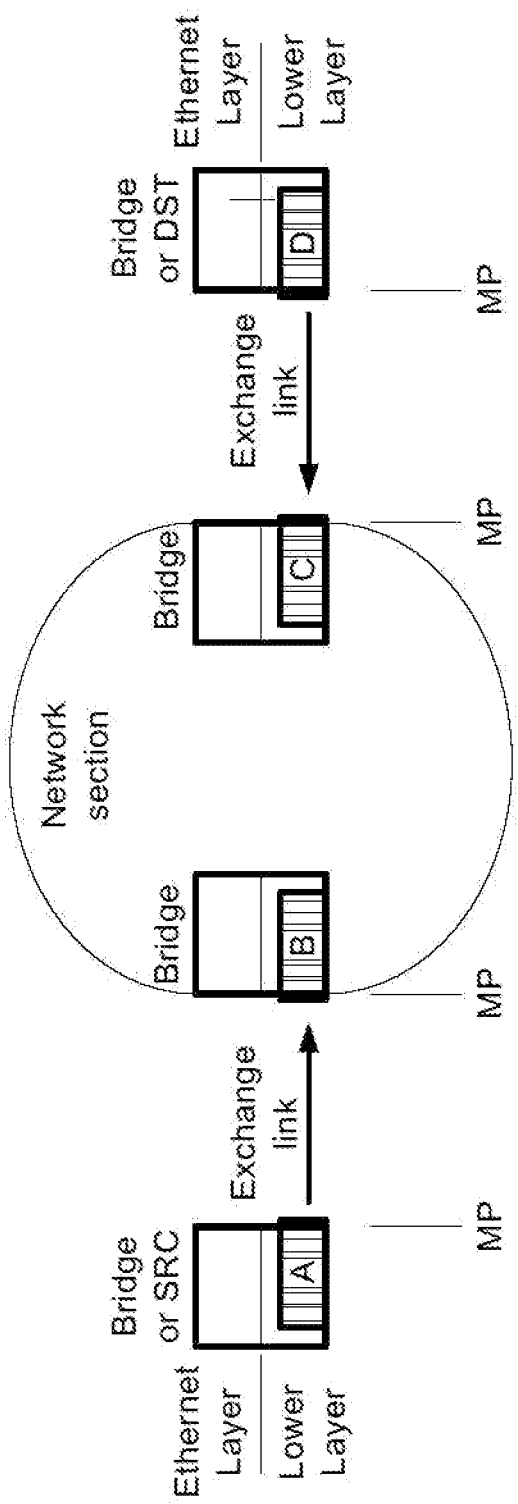
FIG. 4 is an illustration of the location of Measurement Points (MP) in an Ethernet, from ITU Y.1563.

FIG. 5 is a diagrammatic illustration of a system similar to that of FIG. 4 in which the FPGA is configured as an embedded traffic generator.

FIG. 6 is a diagrammatic illustration of a system similar to that of FIG. 4 in which the FPGA is configured to perform intelligent loop back.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method for measuring one or more performance parameter relating to a test path of a network, said test path comprising an originator and multiple reflectors comprising:
   generating by the originator a test protocol data unit;
   transmitting said test protocol data unit along the test path;
   generating a unique flow identifier uniquely identifying each reflector in the test path;
   relaying by each reflector said test protocol data unit to a subsequent reflector along said test path while inserting a timestamp in said test protocol data unit associated with said unique flow identifier of the reflector;
   collecting measurements of said performance parameters at each of said multiple reflectors;
   inserting said collected measurements in said test protocol data unit associated with said unique flow identifier corresponding to the reflector in which that measurement was collected; and
   analyzing the collected measurements relative to said test protocol data unit to measure said one or more performance parameters of said test path;
   wherein each reflector, upon receiving said test protocol data unit, generates and relays a direct reply to said originator.

2. The method of claim 1, in which said performance parameters include delay.

3. The method of claim 1, in which said analyzing comprises computing a total two-way delay measurement of said test data protocol unit's transit along said test path from said originator to the last reflector, and back from the last reflector to said originator, based on said timestamps inserted in the test protocol data unit in both the downstream and upstream directions.

4. The method of claim 1, in which each of said reflectors is configured with the addressing information of the next reflector in said test path, and said addressing information is used to relay the test protocol data unit to said next reflector.

5. The method of claim 3, in which said one of said multiple reflectors retrieves a reverse address from said test protocol data unit and inserts a reverse address for said subsequent reflector along said test path, said one of said multiple reflectors utilizing said reverse address to return said test protocol data unit in the reverse direction along said test path.

6. The method of claim 1 in which said performance parameters are stored in a test data protocol unit that stores at least three timestamp values, and if said test data protocol unit does not store at least three timestamp values, said test data protocol unit is expanded to store at least three timestamp values.

7. The method of claim 1, in which said originator pre-fills said test data protocol unit with each reflector's addressing information corresponding to the unique flow identifier and said addressing information is used to relay the test data protocol unit to the next reflector.

8. The method of claim 1, further comprising transmitting by each of said reflectors said measurements of performance parameters directly back to said originator.

9. A system for measuring one or more performance parameter relating to a test path of a network, said test path comprising an originator and multiple reflectors comprising:
   a test protocol data unit generated by the originator and transmitted along the test path;
   a unique flow identifier uniquely identifying each reflector in the test path;
   a timestamp inserted in said test protocol data unit associated with said unique flow identifier of the reflector when said test protocol data unit is relayed by one reflector to another a subsequent reflector downstream in the test path;
   a collection of measurements of said performance parameters at each of said multiple reflectors inserted in said test protocol data unit associated with said unique flow identifier corresponding to the reflector in which that measurement was collected; and
   said collected measurements relative to said test protocol data unit analyzed to measure the one or more performance parameter of said test path;
   wherein each reflector, upon receiving said test protocol data unit, generates and relays a direct reply to said originator.

10. The system of claim 9, in which said performance parameters include delay.

11. The system of claim 9, further comprising a total two-way delay measurement of said test data protocol unit's transit computed along said test path from said originator to the last reflector, and back from the last reflector to said originator, based on said timestamps inserted in the test protocol data unit in both the downstream and upstream directions.

13. The system of claim 9, in which each of said reflectors is configured with the addressing information of the next reflector in said test path, and said addressing information is used to relay the test protocol data unit to said next reflector.

13. The system of claim 9, in which said one of said multiple reflectors retrieves a reverse address from said test protocol data unit and inserts a reverse address for said subsequent reflector along said test path, said one of said multiple reflectors utilizing said reverse address to return said test protocol data unit in the reverse direction along said test path.

14. The system of claim 9, in which said performance parameters are stored in a test data protocol unit that stores at least three timestamp values, and if said test data protocol unit does not store at least three timestamp values, said test data protocol unit is expanded to store at least three timestamp values.

15. The system of claim 9, in which said originator pre-fills said test data protocol unit with each reflector's addressing information corresponding to the unique flow identifier, and said addressing information is used to relay the test data protocol unit to the next reflector.

* * * * *